United States Patent
> Spanoudis

[15] 3,660,060
[45] May 2, 1972

[54] PROCESS OF MAKING GLASS LASERS OF INCREASED HEAT DISSIPATION CAPABILITY

[72] Inventor: Louis Spanoudis, Toledo, Ohio

[73] Assignee: Owens-Illinois, Inc.

[22] Filed: Dec. 11, 1969

[21] Appl. No.: 884,359

[52] U.S. Cl. ................................. 65/30, 65/31, 65/116, 106/52
[51] Int. Cl. .................................................. C03c 21/00
[58] Field of Search .................. 65/30, 31, 114, 116; 106/52

[56] References Cited

UNITED STATES PATENTS

| | | | |
|---|---|---|---|
| 3,535,266 | 10/1970 | Lee, Jr. | 106/52 X |
| 3,357,876 | 12/1967 | Rinehart | 65/30 X |
| 3,023,139 | 2/1962 | Tetterode | 65/31 X |

*Primary Examiner*—Arthur D. Kellogg
*Attorney*—Richard D. Heberling and E. J. Holler

[57] ABSTRACT

Glass lasers containing at least 1 mole percent of lithium oxide based on the total glass composition expressed in oxide content and 0 0 compound are treated by immersing or otherwise contacting the glass laser in a molten bath containing a mixture of sodium and lithium salts at an elevated temperature, preferably below the strain point of the glass laser. Optionally, the ion exchange immersion in the molten bath may be followed by washing with acid such as hydrofluoric to produce an acid polish. Glass laser rods so treated develop a compressive stress surface layer and exhibit high modulus of rupture.

11 Claims, No Drawings

PROCESS OF MAKING GLASS LASERS OF INCREASED HEAT DISSIPATION CAPABILITY

Glass lasers are exposed to great amounts of heat in the course of the operation of laser apparatus. When a glass laser is subjected to high energy levels the main energy fraction is heat which causes the rod to become hot. Under prolonged operation the heat absorbed by the glass laser causes distortion. In severe cases the rod fractures parallel to the rod axis with the crack propagating radially from the outside surface to the interior. This tendency to fracture generally limits the usefulness of glass lasers in a high energy application such as welding and curtails operation to lower energy level applications. Of the many kinds of damage observed in the past in glass laser rods, the damage due to very high 1.06 micron radiation intensities is referred to most often. There are, however, a number of other types of damage which are equally familiar to persons skilled in the art. One particular damage occurs when a heavily pumped glass laser is fired a number of times in rapid succession. After a certain period of time the thermal gradient builds up within the glass laser rod. As a result a stress condition develops in which the center of the rod is under compression and the surface is in tension. When the thermal gradient reaches a magnitude that the tensile stress at the rod surface exceeds the rupture strength of the glass, the rod fractures. There is therefore, an upper limit to the magnitude of the thermal gradient that a laser rod can sustain and still retain its integrity. This thermal gradient reflects the rate at which heat is removed from the rod and heat must be removed at a rate which equals or exceeds the rate at which it is applied. It is clear that this maximum sustainable thermal gradient determines the maximum average power at which the laser rod can be safely irradiated. In other words, the maximum power handling capability of a laser rod is determined by that point at which the thermally induced tensile stress at the surface exceeds its rupture strength. For typical laser rods, this maximum power handling capability is relatively independent of the diameter of the rod and can be described in terms of a power loading per unit of length.

The power loading referred to is the heat absorbed by the laser rod when irradiated by the flash lamp and usually represents between 15 and 25 percent of the flash lamp electrical input. For example, a glass laser rod being pumped over 6 inches of its length will withstand without breaking a maximum electrical input of about 1,200 watts or 200 watts per inch. This figure corresponds to an absorbed power of about 300 watts or 50 watts per inch.

The power loading capability or breaking point of a laser rod can be improved to a limited extent by using certain geometric configurations. For example, a hollow rod or tube can have a higher breakage point than a solid rod by a factor of 2 or 3 and still retain reasonable efficiency. Aside from the doughnut shaped beam produced by the tubes, however, this shape has other drawbacks. For example, the inner and outer surfaces must be cooled equally to gain full benefit accomplished only by allowing the coolant to flow over the rod face.

A much greater improvement in the average power handling capability of glass laser rods is desired in order to adequately challenge the capabilities of flash lamps. In order to achieve that capability, the resistance to breakage of the glass laser rods must be improved by at least a factor of 3 or 4, preferably 5 or 6. One method of improving the power loading limitation of a glass laser is to increase the thermal conductivity of the glass; another is to decrease the thermal expansion of the glass. Both of these approaches usually require changes in chemical composition of the glass. Yet, particularly when using high lithium oxide containing glass laser rods which have high efficiencies and other extremely desirable properties, changes in the proportions and/or composition in order to bring about increased thermal conductivity or decrease thermal expansion would deleteriously and adversely affect the other desirable properties to an extent whereby the benefits achieved in higher average power handling capabilities would be offset by loss of other desirable properties. Consequently, methods of changing the composition of the glass in order to arrive at an improved thermal conductivity or decreased thermal expansion have not met with complete satisfaction.

It is accordingly an object of the present invention to provide a glass laser of increased heat dissipation capability which overcomes the problems and difficulties experienced from prior methods.

It is another object of the present invention to provide a process for treating glass lasers in order to remarkably increase the modulus of rupture of the glass laser rods and thereby increase the heat dissipation capability of the glass laser.

It is a further object of the present invention to provide a method of treating glass lasers to increase the heat dissipation capability thereof.

In attaining the above and other objects, one feature of the present invention resides in subjecting a glass laser containing at least 1 mole percent lithium oxide based on the total glass composition expressed in oxide content to an ion exchange treatment employing a mixture of sodium and lithium salts at an elevated temperature for a sufficient length of time to replace a portion of the lithium ions in the surface of the glass laser with sodium ions but for a time insufficient to relax the compressive stress formed in the surface of the glass laser.

A further feature of the present invention resides in contacting a glass laser containing at least 1 mole percent lithium oxide with a mixture of sodium and lithium salts at a temperature below the strain point of the glass laser to carry out an ion exchange in the surface of the glass laser and replace a portion of the lithium ion in the surface of the glass laser with sodium ions.

Another feature of the present invention resides in immersing a high lithium oxide containing glass laser into a molten salt bath of sodium and lithium salt mixtures at a temperature below the strain point of the glass.

There has been proposed a method of strengthening glass articles wherein a larger cation in a molten bath is substituted for a smaller cation in the glass surface at a temperature below the strain point of the glass thus creating a compression stress in the surface layer of the glass. When adapted to use with glass laser rods it was determined that a double stress layer was obtained wherein the outer surface layer was in low order tension and the underlying layer was in very high compression. The tension layer on the surface tends to spall during handling or processing of the glass laser rods after the ion exchange treatment. Furthermore, an acid wash generally is needed with high lithium containing glass lasers treated in accordance with the above mentioned procedure to remove the tension layer. In view of this undesirable tendency to form a lower tension stress surface layer, the art has sought other methods and procedure to correct the shortcomings of glass lasers.

It has now been determined in accordance with the present invention that glass laser containing at least 1 mole percent lithium oxide, and particularly glass lasers having a high lithium oxide content such as 20 mole percent or even more may be treated to greatly increase the modulus of rupture thereof and to increase the heat dissipation capability thereof.

Further, the present invention provides improved glass lasers which contain a compressive stress surface layer and are free of the tendency to spall and avoid the formation of a low order tension layer on the surface thereof.

In carrying out the invention, a glass laser having a lithium oxide content that is equal to at least 1 mole percent based on the total glass composition expressed in oxide content, and preferably at least about 15 mole percent, is contacted with a mixture of a sodium and a lithium salt at an elevated temperature for a sufficient period of time to exchange a portion of the lithium ions in the surface of the glass for sodium ions in the salt mixture in contact with the glass laser surface. The glass laser can be in any convenient shape such as rod, hollow cylinder, or fiber, or any other configuration.

In applying the salt mixture to the glass laser, any convenient procedure may be used thus, the salt mixture can be in molten form and the glass laser immersed therein for a desired period of time. Another way to carry out the process is to spray a solution of the salt mixture onto the glass surface. Water solutions, or organic solvents or mixtures thereof can be used for this purpose. While mixtures of sodium and lithium nitrate are shown in the examples which follow, it should be noted that other salts such as chlorides, phosphates, and the like can be used.

The temperature of the ion exchange is generally below the strain point of the glass laser preferably from 50° to 100° C. below the strain point. Usually the minimum temperature for ion exchange is 200° C. and the maximum is the fiber softening point of the glass. Depending upon the extent of the ion exchange desired, the glass lasers are subjected to the elevated temperature for varying periods, e.g., from 5 minutes to 50 hours or even more. Generally, the time of the ion exchange treatment is insufficient to achieve any substantial relaxation of the compressive stress layer that is formed in the surface of the glass laser.

It is generally desirable to acid polish the glass laser rods prior to the immersion in the molten salt bath. This acid polishing or acid fortification of the glass laser rod removes surface defects which would tend to cause spalling. Suitable acid etching agents are hydrofluoric acid solutions, mixture thereof with the acids, salts and the like. Acid etching of glass is known in the art and any of the known compositions and procedure can be used herein as will be apparent to those skilled in the art.

Lithia glasses suitable for practice according to this invention are those which contain at least 1 mole percent, preferably at least 15 mole percent or more lithium oxide expressed as $Li_2O$ which is present in the glass based on a total oxide content. The glasses are lithia silicate glass and also contain $SiO_2$ and may further contain $Al_2O_3$. In addition they contain a small amount, usually for example 0.1 to 2 mole percent of a laseable material, such as a rare earth oxide; illustratively, neodymium oxide. The balance of the glass is the usual glass making oxides. As will be apparent, the customary glass batch ingredients can be employed in working the glass lasers which are treated according to the methods described herein.

Glass laser compositions suitable for practice of this invention contain the following ingredients in the approximate mole percent:

| | |
|---|---|
| $SiO_2$ | 45 to 75 |
| $Al_2O_3$ | 0 to 8 |
| $Li_2O$ | 15 to 35 |
| CaO | 0.5 to 30 |
| $Nd_2O_3$ | 0.1 to 2 |

Preferably the glass lasers contain in mole percent:

| | |
|---|---|
| $SiO_2$ | 48 to 65 |
| $Al_2O_3$ | 0 to 8 |
| $Li_2O$ | 20 to 30 |
| CaO | 5 to 25 |
| $CeO_2$ | 0.1 to 0.3 |
| $Nd_2O_3$ | 0.1 to 2 |

Most preferred are the following compositions in mole percent:

| | |
|---|---|
| $SiO_2$ | 49 to 62 |
| $Al_2O_3$ | 2 to 5 |
| $Li_2O$ | 25 to 30 |
| CaO | 8 to 22 |
| $CeO_2$ | 0.1 to 0.2 |
| $Nd_2O_3$ | 0.1 to 1 |

The following examples serve to illustrate the present invention.

EXAMPLE I

Several samples of a high lithium glass laser rod having the following formulation when prepared:

| | |
|---|---|
| $SiO_2$ | 65% by weight |
| $Al_2O_3$ | 5% |
| CaO | 10% |
| $CeO_2$ | 0.5% |
| $Li_2O$ | 16.5% |
| $Nd_2O_3$ | 3% |

The samples were acid polished by immersing the glass laser rods six times for ten seconds duration in a solution containing 30 percent by volume of 48 percent hydrofluoric acid and 70 percent by volume of concentrated $H_2SO_4$. The glass laser rods were then placed in a molten bath of a mixture of sodium nitrate and lithium nitrate at 662° F. (350° C.). The following table gives the results of the treatment times and the surface stress which was measured as well as the depth of the stress layer in microns.

TABLE 1. TREATMENT IN MOLTEN BATHS OF $NaNO_3$—$LiNO_3$ MIXTURES AT 350°C.

| Wt. % $LiNO_3$ | Wt. % $NaNO_3$ | Treatment Time (hrs) | Surface Stress (psi) | Depth of Stress (Microns) |
|---|---|---|---|---|
| 1.0 | 99.0 | 48 | 27,100 | 80 |
| 10.0 | 90.0 | 48 | 13,700 | 63 |
| 25.0 | 75.0 | 48 | 10,700 | 43 |
| 1.0 | 99.0 | 120 | 31,800 | 110 |
| 10.0 | 90.0 | 120 | 10,100 | 115 |
| 25.0 | 75.0 | 120 | 6,700 | 108 |

None of the above samples showed any evidence of a tension layer on the surface although identical glass samples treated in an identical procedure but where the molten salt was 100 percent sodium nitrate exhibited substantial amounts of a low tension layer which tended to spall when sections were taken of the glass laser rod. It was further determined that in those situations where the concentration of the lithium nitrate exceeded 10 percent there was a tendency to develop a slight surface haze on the glass laser rod. The foregoing example shows that the tension layer formed on the lithium oxide glass laser which would normally be formed during immersion into molten sodium nitrate at 350° C. can be prevented by adding to the molten bath, lithium nitrate in a concentration of at least about 1 percent. The result also indicated the desirability of maintaining the lithium concentration as low as possible because the stress layer decreases in intensity or magnitude and in depth with increasing lithium salt concentration.

EXAMPLE II

In an effort to determine the minimum concentration of lithium nitrate that would be required to prevent the formation of the tension surface layer in a high lithium oxide laser glass the following experimental work was carried out. Using the high lithium containing glass laser as defined in Example I, glass laser rods were immersed into mixtures containing lithium nitrate and sodium nitrate in varying amounts.

TABLE 2. TREATMENT IN MOLTEN BATHS OF $NaNO_3$—$LiNO_3$ MIXTURES AT 350°C.

| Wt. % $LiNO_3$ | Wt. % $NaNO_3$ | Treatment Time (hrs) | Surface Stress (psi) | Depth of Stress (Microns) |
|---|---|---|---|---|
| 0.2 | 99.8 | 48 | 40,900 | 80* |
| 0.5 | 99.5 | 48 | 26,900 | 112* |
| 2.0 | 98.0 | 48 | 25,800 | 80 |
| 0.2 | 99.8 | 120 | 30,700 | 131* |
| 0.5 | 99.5 | 120 | 27,100 | 164* |
| 2.0 | 98.0 | 120 | 26,000 | 177 |

*These samples contained a tension layer on the surface.

None of the glass laser rods treated in accordance with this example exhibited surface haze. It was therefore concluded that at a lithium nitrate concentration greater than about 0.5 percent to between 1 percent, the formation of a tension layer on the surface of this particular glass laser can be prevented. The results also indicate that a maximum in the surface stress was obtained without any deleterious effect, such as surface haze formation, or tension surface layer at a concentration between 1 and 2 percent lithium nitrate.

EXAMPLE III

To determine the effect of temperature upon the surface stress and tension surface layer the following experiment was conducted: employing the identical laser glass of Example I, various samples thereof were immersed in a mixture of sodium nitrate with varying amounts of each. The temperature in the following runs was kept at 400° C. which is substantially higher than the temperature which was employed in Examples I and II and is near the strain point of the glass, which is about 429° C. The following results were obtained:

TABLE 3. TREATMENT IN NaNO$_3$—LiNO$_3$ AT 400°C.

| Wt. % LiNO$_3$ | Wt. % NaNO$_3$ | Treatment Time (hrs) | Surface Stress (psi) | Depth of Stress (Microns) |
|---|---|---|---|---|
| 1.0 | 99.0 | 4.5 | 26,200 | 43 |
| 1.0 | 99.0 | 8.0 | 26,400 | 67* |
| 1.0 | 99.0 | 24 | 27,600 | 95* |
| 1.0 | 99.0 | 48 | 20,000 | 117* |
| 2.0 | 98.0 | 8.25 | 30,000 | 61 |
| 2.0 | 98.0 | 16.25 | 26,900 | 92 |
| 2.0 | 98.0 | 47.25 | 26,324 | 127 |
| 3.0 | 97.0 | 8.25 | 18,000 | 41* |
| 3.0 | 97.0 | 16.25 | 17,500 | 73* |
| 5.0 | 95.0 | 8.25 | 17,400 | 49* |
| 5.0 | 95.0 | 16.25 | 13,600 | 89* |

*These samples displayed a tension surface layer.

From the foregoing experimental runs it was concluded that at 400° C., the tension surface layer can be avoided with lithium nitrate concentrations of 1 percent at treatment times up to 4.25 hours but less than about 8.25 hours. At 400° C. the surface tension layer can be avoided with a lithium nitrate concentration of 2 percent at treatment times up to at least 47.25 hours and that the surface tension layer cannot be avoided with higher lithium concentrations, i.e., concentrations of lithium nitrate of 3 or 5 percent. Of course, it should be noted that the results obtained are significant with respect to the composition of Example I. Different laser glass will naturally behave somewhat differently.

EXAMPLE IV

The following sets forth various samples that were used to determine the variation of stress intensity and stress depth as a function of treatment time in 1 percent lithium nitrate-99 percent sodium nitrate molten salt baths at 350° C.

TABLE 4. TREATMENT IN 1.0% LiNO$_3$—99% NaNO$_3$ AT 350°C.

| Treatment Time (hrs) | Square Root of Time (hrs)$^{1/2}$ | Surface Stress (psi) | Stress Depth (Microns) |
|---|---|---|---|
| 48 | 6.94 | 35,300 | 49 |
| 120 | 10.9 | 35,600 | 100 |
| 211 | 14.5 | 30,700 | 116 |
| 286 | 16.9 | 33,600 | 135 |
| 360 | 19.0 | 30,300 | 143 |
| 450 | 21.2 | 38,500 | 158 |

A plot of the stress depth vs the square root of treatment time gave a straight line of the form $$y = mx + b$$

where
 $y$ = stress depth in microns
 $m$ = constant equal to 8.0 microns/(hrs)$^{1/2}$
 $x$ = square root of time (hrs)$^{1/2}$
 $b$ = constant equal to 0

It should be noted that at treatment times up to 450 hours no tension surface layer was developed.

EXAMPLE V

This experiment was conducted to determine if a treatment in a mixed lithium nitrate-sodium nitrate bath could be followed with a treatment in a pure sodium nitrate bath to yield high surface stresses in the 70,000 psi range. All samples in the following tests were pretreated for 120 hours in a molten salt bath containing 1 percent lithium nitrate-900 percent sodium nitrate at 350° C.

TABLE 5. TREATMENT IN NaNO$_3$ AT 662°F. AFTER TREATMENT IN 1% LiNO$_3$—NaNO$_3$ AT 350°C. FOR 120 HOURS

| Treatment Time in NaNO$_3$ (hrs) | Surface Stress (psi) | Stress Depth (Microns) |
|---|---|---|
| 24 | 51,000 | 95* |
| 72 | 59,000 | 111* |

*These samples exhibited tension surface layers.

The foregoing experiment demonstrates that high stresses can be obtained in a two step method wherein the second step is carried out by immersing the glass laser rod in sodium nitrate at an elevated temperature. However it should be noted that the second treatment tends to form a surface tension layer. The formation of the tension layer can be alleviated somewhat by following the treatment with an acid wash to remove the surface layer.

EXAMPLE VI

To determine the modulus of rupture of a high lithium containing glass identified in Example I and treated with one of the preferred methods of 120 hours in a bath of 1 percent lithium nitrate-99 percent sodium nitrate at 350° C. the following experiment was run. Ten 6-inch rods one-quarter inch in diameter were acid washed by being immersed six times in a solution of 30 percent by volume, 48 percent HF and 70 percent by volume concentrated H$_2$SO$_4$. The dips were 10 seconds in duration. Five of these rods were then taken and immersed in a mixed salt bath identified above. The remaining five were left untreated. Each group of five rods was separately rotated in a 1 gallon plastic jar containing 100 grams of No. 46 grit silicon carbide. The rods were then tested in flexure using a four point loading. The following results were obtained.

TABLE 6. COMPARISON OF STRENGTH TESTS

| Treatment | MOR (psi) | $\sigma$ (psi) |
|---|---|---|
| 120 hrs. 1% LiNO$_3$—99% NaNO$_3$—662°F. | 52,340 | 2,000 |
| None | 6,833 | 375 |

The above results demonstrate that the treatment produces a 7½ fold increase in the abraded modulus of rupture in the above high lithium oxide containing glass as compared to glass laser rods which have received no treatment.

In accordance with the procedures described hereinabove and particularly in the examples, it will be apparent to those skilled in the art that the glass laser rods can be treated over their entire length including the polished face surfaces. This is particularly important since the entire surface and particularly the polished ends are subjected to thermal abuse during operation. Furthermore, the test results obtained, as shown in the foregoing examples, indicate representative values for the modulus of rupture and should not be taken as an indication that these are necessarily limiting values.

It is understood that various other modifications will be apparent to and can readily be made by those skilled in the art without departing from the scope and spirit of this invention. Accordingly, it is not intended that the scope of the claims appended hereto be limited to the description set forth herein but rather that the claims be construed as encompassing all the features of patentable novelty which reside in the present invention including all features which would be treated as equivalents thereof by those skilled in the art to which the invention pertains.

What is claimed is:

1. A process for increasing the heat dissipation capability of a glass laser containing at least 1 mole percent lithium oxide based on the total glass composition expressed in oxide content which comprises contacting the glass laser with a mixture of salt comprising a sodium salt and a lithium salt wherein the lithium salt is present in an amount of at least 0.5 percent by weight and no greater than 5 percent by weight of the mixture of sodium and lithium salts, at an elevated temperature and for a sufficient time period to effect an ion exchange between the sodium ions in the salt mixture and the lithium ions in the glass laser body, but for a time insufficient to achieve stress relaxation of the compressive surface layer formed in the glass laser.

2. The method as set forth in claim 1 wherein the glass laser is in the form of a rod.

3. The method as set forth in claim 1 wherein the lithium salt is lithium nitrate.

4. The method of claim 1 wherein the sodium salt is sodium nitrate.

5. The method as set forth in claim 1 wherein the amount of lithium nitrate is from 1 to 2 percent by weight.

6. The method of claim 1 wherein the glass laser is immersed in a molten salt mixture at a temperature below the strain point of the glass.

7. The method of claim 1 wherein the glass contains the following ingredients in the appropriate mole percent:

| | |
|---|---|
| $SiO_2$ | 45 to 75 |
| $Al_2O_3$ | 0 to 8 |
| $Li_2O$ | 15 to 35 |
| $CaO$ | 0.5 to 30 |
| $Nd_2O_3$ | 0.1 to 2 |

8. The method of claim 1 wherein the glass contains the following ingredients in the approximate mole percent:

| | |
|---|---|
| $SiO_2$ | 48 to 65 |
| $Al_2O_3$ | 0 to 8 |
| $Li_2O$ | 20 to 30 |
| $CaO$ | 5 to 25 |
| $CeO_2$ | 0.1 to 0.3 |
| $Nd_2O_3$ | 0.1 to 2 |

9. The method of claim 1 wherein the glass contains the following ingredients in the approximate mole percent:

| | |
|---|---|
| $SiO_2$ | 49 to 62 |
| $Al_2O_3$ | 2 to 5 |
| $Li_2O$ | 25 to 30 |
| $CaO$ | 8 to 22 |
| $CeO_2$ | 0.1 to 0.2 |
| $Nd_2O_3$ | 0.1 to 1 |

10. A process for increasing the heat dissipation capability of a glass laser containing at least 1 mole percent lithium oxide based on the total glass composite expressed in mole content, comprising
contacting the glass laser with sufficient acid to substantially remove surface defects and imperfections, contacting the glass laser with a mixture of lithium nitrate and sodium nitrate salt wherein the lithium nitrate is present in an amount of at least 0.5 percent by weight and no more than 5 percent by weight, subjecting the glass laser in contact with the said mixture of salts to an elevated temperature below the strain point of the glass for a sufficient period of time to effect an exchange between the sodium ions of the salt and the lithium ions in the glass laser body, and to achieve a strengthening of the glass but for a time insufficient to achieve relaxation of the compressive surface layer formed in the glass laser.

11. A glass laser treated in accordance with the method of claim 1 wherein the outer surface is in a state of high compression and the interior of the glass laser is in a state of low order tension.

* * * * *